(12) United States Patent
Tsai et al.

(10) Patent No.: US 8,736,180 B2
(45) Date of Patent: May 27, 2014

(54) ORGANIC LIGHT-EMITTING DIODE DISPLAY

(75) Inventors: Tsung-Ting Tsai, Hsin-Chu (TW); Lee-Hsun Chang, Hsin-Chu (TW)

(73) Assignee: AU Optronics Corp., Hsinchu (TW)

( * ) Notice: Subject to any disclaimer, the term of this patent is extended or adjusted under 35 U.S.C. 154(b) by 728 days.

(21) Appl. No.: 12/959,000

(22) Filed: Dec. 2, 2010

(65) Prior Publication Data

US 2011/0260630 A1 Oct. 27, 2011

(30) Foreign Application Priority Data

Apr. 21, 2010 (TW) ................................ 99112544 A

(51) Int. Cl.
*G09G 3/10* (2006.01)

(52) U.S. Cl.
USPC ........... 315/160; 315/169.3; 345/76; 345/211

(58) Field of Classification Search
USPC ......... 315/169.1, 169.2, 169.3; 345/211, 212, 345/213
See application file for complete search history.

(56) References Cited

U.S. PATENT DOCUMENTS

| | | | |
|---|---|---|---|
| 4,749,836 A | 6/1988 | Matsuo et al. | |
| 6,225,510 B1 | 5/2001 | Frenkel et al. | |
| 2003/0234760 A1 | 12/2003 | Lin et al. | |
| 2005/0030268 A1 | 2/2005 | Zhang et al. | |
| 2005/0110723 A1 | 5/2005 | Shin | |
| 2005/0162353 A1 | 7/2005 | Kanda | |
| 2006/0170342 A1 | 8/2006 | Kim et al. | |
| 2006/0176536 A1 | 8/2006 | Widzgowski et al. | |
| 2007/0221668 A1 | 9/2007 | Baarman et al. | |
| 2008/0217999 A1 | 9/2008 | Baarman et al. | |
| 2008/0266282 A1* | 10/2008 | Lee et al. | 345/211 |
| 2009/0262258 A1 | 10/2009 | Taneda et al. | |
| 2009/0321425 A1 | 12/2009 | Meier et al. | |
| 2010/0177086 A1* | 7/2010 | Nakamura et al. | 345/211 |
| 2012/0032524 A1 | 2/2012 | Baarman et al. | |
| 2013/0076603 A1 | 3/2013 | Taneda et al. | |

FOREIGN PATENT DOCUMENTS

| | | |
|---|---|---|
| TW | 584828 B | 4/2004 |
| TW | 200806929 A | 2/2008 |
| TW | 200947390 A | 11/2009 |

OTHER PUBLICATIONS

Taiwan Patent Office, "Office Action", Nov. 11, 2006
Taiwan Patent Office, "Office Action", Feb. 14, 2014.

* cited by examiner

*Primary Examiner* — Douglas W Owens
*Assistant Examiner* — Jonathan Cooper
(74) *Attorney, Agent, or Firm* — WPAT, PC; Justin King

(57) ABSTRACT

An OLED display includes an OLED panel, two conducting wires and a power supply. A display region of the OLED panel is divided into two sub-display regions. The two conducting wires are both disposed on the panel and out of the display region, and first terminals of the two conducting wires are electrically coupled to pixels in the first sub-display region and the second sub-display region respectively. The length of a conducting wire is longer than that of another conducting wire so that the resistance of the conducting wire is larger than that of the said another conducting wire. The power supply provides a relatively high voltage and a relatively low voltage to the second terminals of the relatively long conducting wire and the relatively short conducting wire respectively, so that the voltages of the first terminals of the two conducting wires are substantially the same.

15 Claims, 4 Drawing Sheets

US 8,736,180 B2

ORGANIC LIGHT-EMITTING DIODE DISPLAY

BACKGROUND

1. Technical Field

The present invention relates to an organic light-emitting diode (OLED) display and, more particularly, to an OLED display which can improve the problem of non-uniform luminance of pixels caused by IR-drop.

2. Description of the Related Art

OLED (Organic Light-Emitting Diode) panel employs OLED as light-emitting element. The OLED is driven by current, and the luminance thereof changes with the current passing through the OLED. Therefore, how to accurately control the value of the current passing through the OLED is an important problem of developing the OLED panel.

Referring to FIG. 1, a schematic view of a conventional OLED display is shown. The OLED display 100 comprises a scan driving circuit 110, a data driving circuit 120, a power supply 130 and an OLED panel 140. The OLED panel 140 comprises a plurality of scan lines (as shown by mark 142), a plurality of data lines (as shown by mark 144), a conducting wire 146 and a plurality of pixels (as shown by mark 148). Each of the pixels 148 is composed of a transistor 148-1, a transistor 148-2, a capacitor 148-3 and an OLED 148-4, and OVSS as shown in FIG. 1 is a reference voltage. The coupling relation of the above elements is shown in FIG. 1 and is not described herein. In addition, the pixels 148 are arranged in an array to form a display region of the OLED panel 140 for displaying images or words.

In the structure as shown in FIG. 1, the transistor 148-2 of each of the pixels 148 is electrically coupled to a voltage OVDD supplied by the power supply 130 through the conducting wire 146, so as to obtain a display potential (as shown by mark OVDD'). The cathode of the OLED 148-4 of each of the pixels 148 is electrically coupled to the reference voltage OVSS to obtain a reference potential. The data voltage transmitted by a corresponding data line 144 and the potential difference between the display potential OVDD' and the reference potential will jointly influence the value of the current passing through the OLED 148-4 and thereby control the luminance of the OLED 148-4.

Generally, the value of the reference potential is constant. However, the values of the display potentials OVDD' of the pixels 148 are different from each other because the locations of the pixels are different. That is, the current supplied by the power supply 130 is transmitted to different pixels 148 through different current-transmitting paths, and the different current-transmitting paths cause different voltage drops (that is the IR-drop). Thus, the display potentials OVDD' received by the pixels 148 are different from each other.

In summary, since the display potentials OVDD' received by the pixels 148 are different from each other, the currents of the OLEDs 148-4 are different from each other. Thus, the luminance of the OLEDs 148-4 is non-uniform. In other words, the IR-drop will cause the non-uniform luminance of the pixels 148.

BRIEF SUMMARY

The present invention relates to an OLED display, which can improve the problem of the non-uniform luminance of the pixels caused by the IR-drop.

An OLED display in accordance with an exemplary embodiment of the present invention comprises an OLED panel, a first conducting wire, a second conducting wire and a power supply. The OLED panel has a display region formed by a plurality of pixels, and the display region is divided into a first sub-display region and a second sub-display region. The first conducting wire is disposed on the OLED panel and out of the display region, and a first terminal of the first conducting wire is electrically coupled to each of the pixels in the first sub-display region. The second conducting wire is disposed on the OLED panel and out of the display region, and a first terminal of the second conducting wire is electrically coupled to each of the pixels in the second sub-display region. The length of the second conducting wire is longer than that of the first conducting wire so that the resistance of the second conducting wire is larger than that of the first conducting wire. The power supply is electrically coupled to a second terminal of the first conducting wire and a second terminal of the second conducting wire for providing a first voltage and a second voltage to the second terminal of the first conducting wire and the second terminal of the second conducting wire respectively. The second voltage is larger than the first voltage so that the voltage of the first terminal of the second conducting wire is substantially the same with the voltage of the first terminal of the first conducting wire.

In an exemplary embodiment of the present invention, the second sub-display region is divided into a first sub-sub-display region and a second sub-sub-display region. The OLED display further comprises a third conducting wire disposed on the OLED panel and out of the display region. A first terminal of the third conducting wire is electrically coupled to each of the pixels in the second sub-sub-display region, and the first terminal of the second conducting wire is changed to be electrically coupled to each of the pixels in the first sub-sub-display region. The length of the third conducting wire is longer than that of the second conducting wire so that the resistance of the third conducting wire is larger than that of the second conducting wire. The power supply is further electrically coupled to the second terminal of the third conducting wire to provide a third voltage to the second terminal of the third conducting wire. The third voltage is larger than the second voltage so that the voltage of the first terminal of the third conducting wire is substantially the same with the voltage of the first terminal of the second conducting wire.

In an exemplary embodiment of the present invention, the first sub-display region is divided into a first sub-sub-display region and a second sub-sub-display region, and the second sub-display region is divided into a third sub-sub-display region and a fourth sub-sub-display region. The OLED display further comprises a third conducting wire and a fourth conducting wire. The third conducting wire and the fourth conducting wire are both disposed on the OLED panel and out of the display region. A first terminal of the third conducting wire is electrically coupled to each of the pixels in the second sub-sub-display region, the first terminal of the first conducting wire is changed to be electrically coupled to each of the pixels in the first sub-sub-display region, a first terminal of the fourth conducting wire is electrically coupled to each of the pixels in the fourth sub-sub-display region, and the first terminal of the second conducting wire is changed to be electrically coupled to each of the pixels in the third sub-sub-display region. The length of the fourth conducting wire is longer than that of the third conducting wire. The power supply is further electrically coupled to a second terminal of the third conducting wire and a second terminal of the fourth conducting wire to respectively provide a third voltage and a fourth voltage to the second terminal of the third conducting wire and the second terminal of the fourth conducting wire. The fourth voltage is larger than the third voltage so that the voltage of the first terminal of the fourth conducting wire is substantially the same with the voltage of the first terminal of the third conducting wire.

In the present invention, the display region of the panel is divided into two sub-display regions, and the two conducting wires of the present invention are both disposed on the panel and out of the display region. Furthermore, first terminals of the two conducting wires are electrically coupled to each of the pixels in the first sub-display region and the second sub-display region respectively. The length of one conducting wire is longer than that of another conducting wire, so that the resistance of the conducting wire is larger than that of the said another conducting wire. Therefore, the power supply of the present invention provides a relatively high voltage and a relatively low voltage to the second terminals of the relatively long conducting wire and the relatively short conducting wire respectively. Thus, the voltages of the first terminals of the two conducting wires are substantially the same. Therefore, the display potentials of the pixels are substantially the same, so as to improve the problem of the non-uniform luminance of the pixels caused by the IR-drop.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

It is to be understood that other embodiment may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings.

First Exemplary Embodiment

Figure 1:
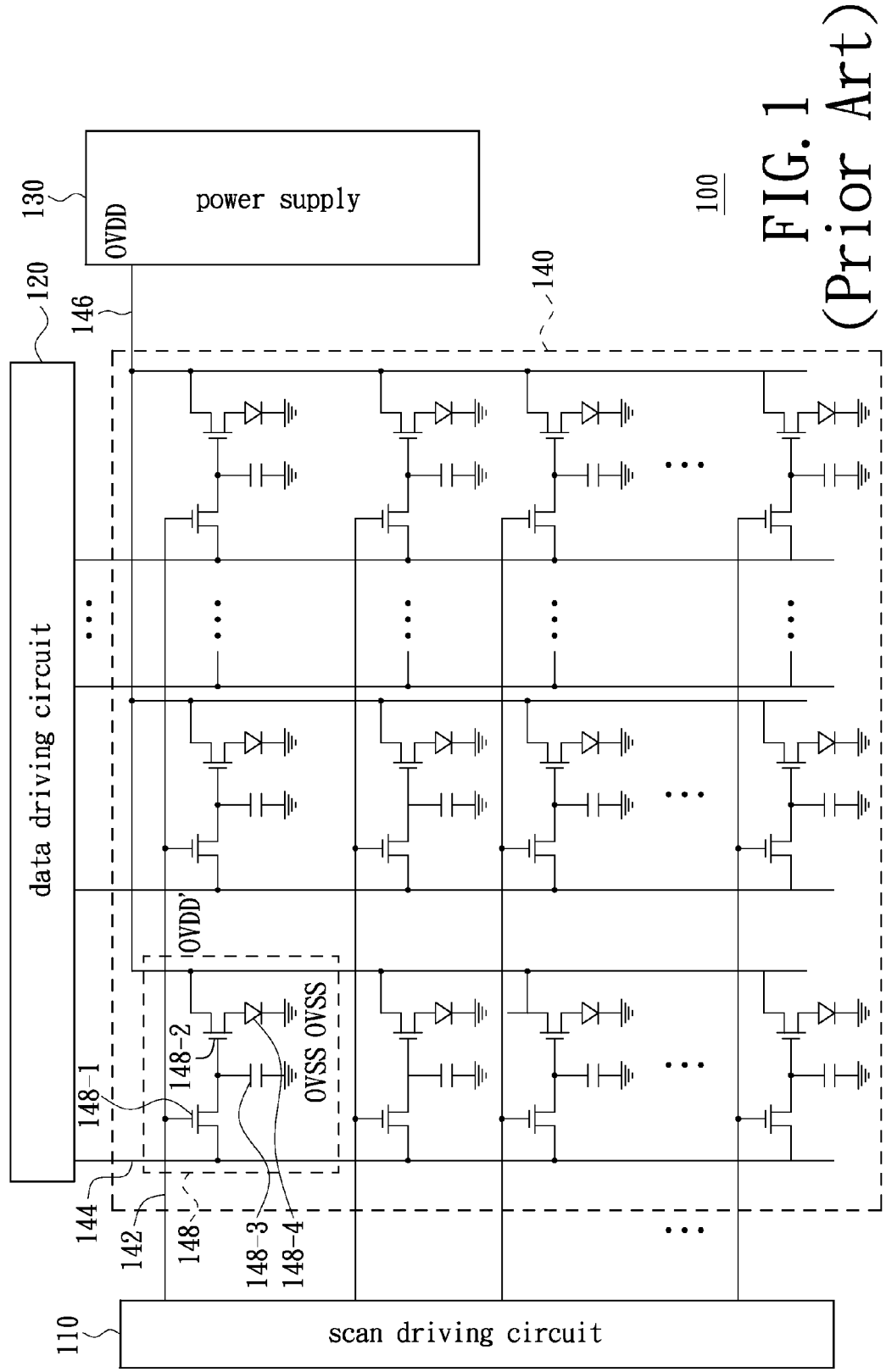
FIG. 1 is a schematic view of a conventional OLED display.
Figure 2:
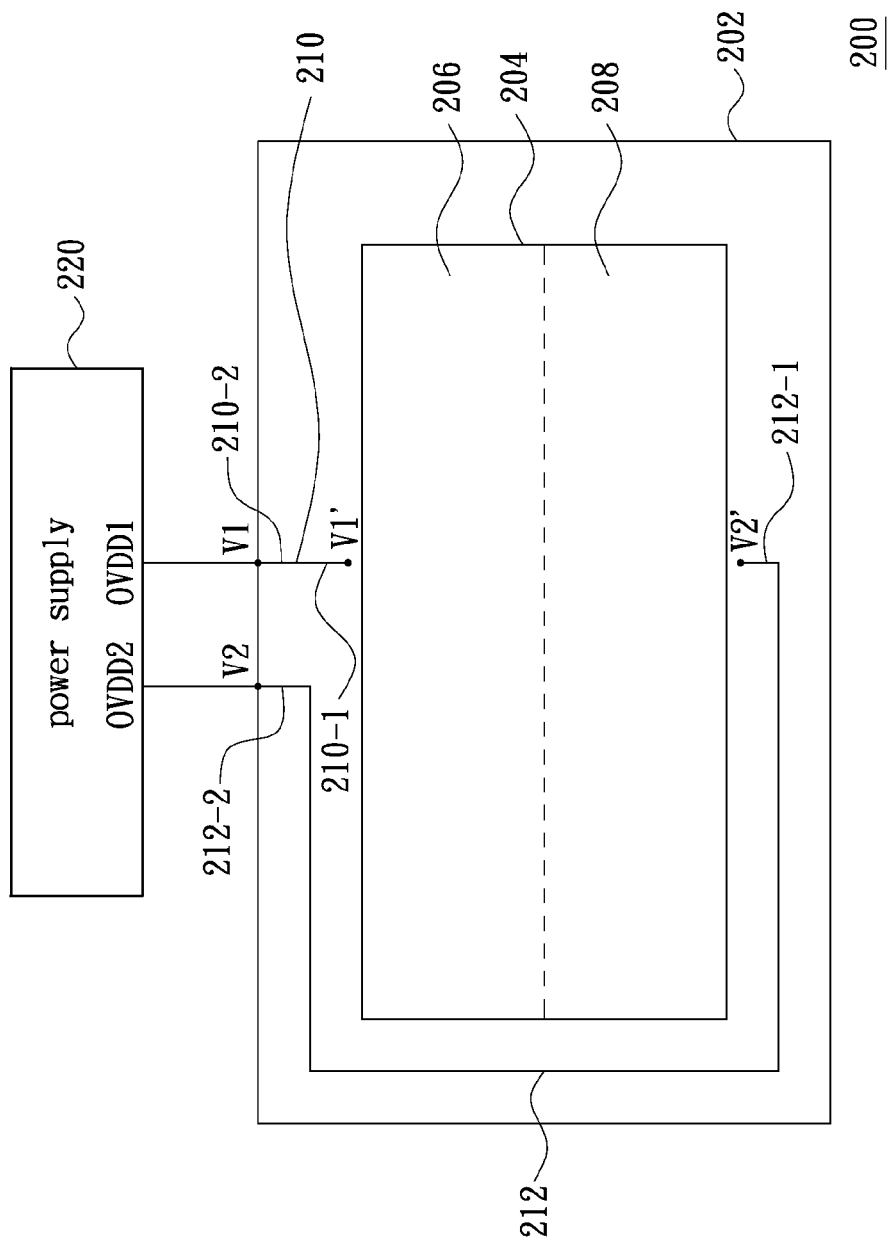
FIG. 2 is a schematic view of an OLED display in accordance with an exemplary embodiment of the present invention.

FIG. 2 is a schematic view of an OLED display in accordance with an exemplary embodiment of the present invention. The OLED display 200 as shown in FIG. 2 only shows the differences between the OLED display 100 as shown in FIG. 1 and the OLED display of the present invention and omits the same portions, so as to avoid giving unnecessary details and confusing the emphasis of the present invention.

As shown in FIG. 2, the OLED display 200 basically comprises an OLED panel 202, a conducting wire 210, a conducting wire 212 and a power supply 220. The OLED panel 202 has a display region 204 formed by a plurality of pixels (not shown), and the display region 204 is divided into two sub-display regions indicated by marks 206 and 208. In this exemplary embodiment, the area of the sub-display region 206 is the same with that of the sub-display region 208. However, the areas of the two sub-display regions may be different from each other.

Furthermore, the conducting wire 210 is disposed on the OLED panel 202 and out of the display region 204. The first terminal 210-1 of the conducting wire 210 is electrically coupled to each of the pixels in the sub-display region 206. The conducting wire 212 is disposed on the OLED panel 202 and out of the display region 204. The first terminal 212-1 of the conducting wire 212 is electrically coupled to each of the pixels in the sub-display region 208. Since the routes of the two conducting wires are different from each other, the length of the conducting wire 212 is longer than that of the conducting wire 210, so that the resistance of the conducting wire 212 is larger than that of the conducting wire 210.

The power supply 220 is electrically coupled to the second terminal 210-2 of the conducting wire 210 and the second terminal 212-2 of the conducting wire 212, so as to respectively provide voltages OVDD1 and OVDD2 to the second terminal 210-2 of the conducting wire 210 and the second terminal 212-2 of the conducting wire 212. The voltage OVDD2 is larger than the voltage OVDD1, so that the voltage (that is V2') of the first terminal 212-1 of the conducting wire 212 is substantially the same with the voltage (that is V1') of the first terminal 210-1 of the conducting wire 210. The following will describe the method for adjusting the voltages.

Assuming that the voltage of the second terminal 210-2 of the conducting wire 210 is V1, the voltage of the second terminal 212-2 of the conducting wires 212 is V2, the resistance of the conducting wire 212 is R2 and the current passing through the conducting wire 212 is I2, the voltage (that is V2') of the first terminal 212-1 of the conducting wire 212 may represent by the equation (1):

$$V2'=V2-I2\times R2 \quad (1)$$

Thus, the circuit designer is able to adjust the value of the voltage OVDD2, so as to enable the voltage (that is V2') of the second terminal 212-2 of the conducting wire 212 to be adjusted accordingly until the voltage (that is V2') of the first terminal 212-1 of the conducting wire is substantially the same with the voltage (that is V1') of the first terminal 210-1 of the conducting wire 210.

From the above description, it can be seen that the display potential of each of the pixels in the sub-display region 206 is provided by the voltage (that is V1') of the first terminal 210-1 of the conducting wire 210. The display potential of each of the pixels in the sub-display region 208 is provided by the voltage (that is V2') of the first terminal 212-1 of the conducting wire 212. The power supply 220 provides a relatively high voltage and a relatively low voltage to the second terminals of the relatively long conducting wire and the relatively short conducting wire respectively, so that the voltages of the first terminals of the two conducting wires are substantially the same. Thus, the display potentials of the pixels are substantially the same, so as to improve the problem of the non-uniform luminance of the pixels caused by the IR-drop.

It should be noted that the two conducting wires may be disposed on a substrate (not shown) of the OLED panel 202 and the substrate may be a glass substrate. Furthermore, from FIG. 2 it can be seen that the shape of the substrate may be a parallelogram, and the second terminals of the two conducting wires may be disposed on a side of the substrate.

Second Exemplary Embodiment

Figure 3:
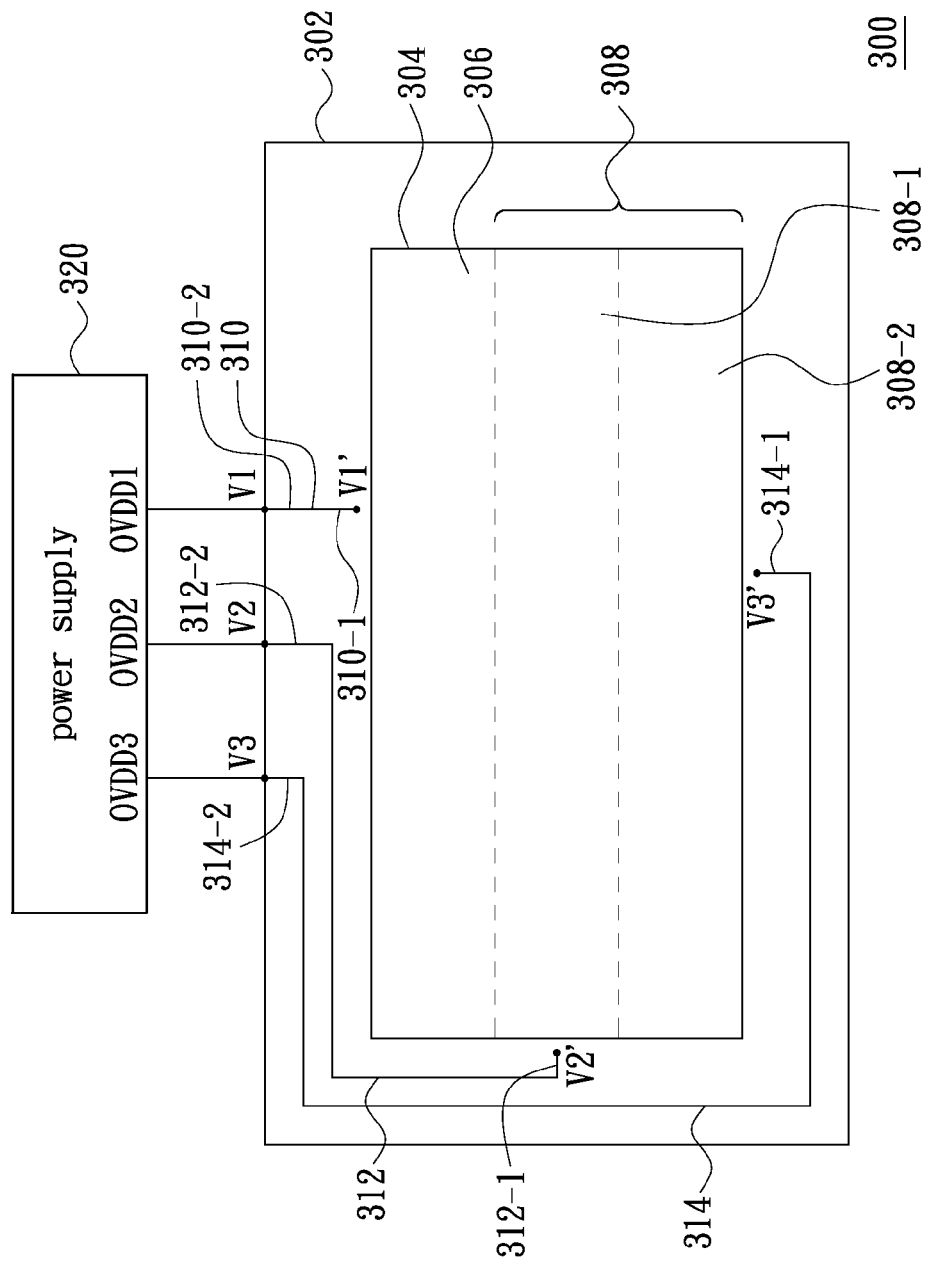
FIG. 3 is a schematic view of an OLED display in accordance with another exemplary embodiment of the present invention.

FIG. 3 is a schematic view of an OLED display in accordance with another exemplary embodiment of the present invention. Referring to FIG. 3, the OLED display 300 basically comprises an OLED panel 302, a conducting wire 310, a conducting wire 312, a conducting wire 314 and a power supply 320. A display region 304 of the OLED panel 302 is divided into two sub-display regions indicated by marks 306 and 308, and the sub-display region 308 is divided into two sub-sub-display regions indicated by marks 308-1 and 308-2. In this exemplary embodiment, the three areas of the sub-display region 306, the sub-sub-display region 308-1 and the sub-sub-display region 308-2 are the same. However, the above three areas may also be different from each other.

The above three conducting wires are all disposed on the OLED panel 302 and out of the display region 304. Furthermore, the first terminal 310-1 of the conducting wire 310 is electrically coupled to each of the pixels in the sub-display region 306, the first terminal 312-1 of the conducting wire 312 is electrically coupled to each of the pixels in the sub-sub-display region 308-1, and the first terminal 314-1 of the conducting wire 314 is electrically coupled to each of the pixels in the sub-sub-display region 308-2. The power supply 320 is electrically coupled to the second terminal 310-2 of the conducting wire 310, the second terminal 312-2 of the conducting wire 312 and the second terminal 314-2 of the conducting wire 314, so as to provide voltages OVDD1, OVDD2 and OVDD3 to the second terminal 310-2 of the conducting wire 310, the second terminal 312-2 of the conducting wire 312 and the second terminal 314-2 of the conducting wire 314 respectively.

From FIG. 3, it can be seen that the length of the conducting wire 314 is longer than that of the conducting wire 312 and the length of the conducting wire 312 is longer than that of the conducting wire 310. Thus, the resistance of the conducting wire 314 is larger than that of the conducting wire 312, and the resistance of the conducting wire 312 is larger than that of the conducting wire 310. Therefore, the circuit designer is able to adjust the value of the voltage OVDD2, so as to adjust the voltage (that is V2) of the second terminal 312-2 of the conducting wire 312 until the voltage (that is V2') of the first terminal 312-1 of the conducting wire 312 is substantially the same with the voltage (that is V1') of the first terminal 310-1 of the conducting wire 310. Then, the circuit designer is able to adjust the value of the voltage OVDD3, so as to adjust the voltage (that is V3) of the second terminal 314-2 of the conducting wire 314 until the voltage (that is V3') of the first terminal 314-1 of the conducting wire 314 is substantially the same with the voltage (that is V2') of the first terminal 312-1 of the conducting wire 312.

From the above description, it can be seen that the display potential of each of the pixels in the sub-display region 306 is provided by the voltage (that is V1') of the first terminal 310-1 of the conducting wire 310. The display potential of each of the pixels in the sub-sub-display region 308-1 is provided by the voltage (that is V2') of the first terminal 312-1 of the conducting wire 312. The display potential of each of the pixels in the sub-sub-display region 308-2 is provided by the voltage (that is V3') of the first terminal 314-1 of the conducting wire 314. The power supply 320 provides three different voltages to the second terminals of the three conducting wires, so that the voltages of the first terminals of the three conducting wires are substantially the same. Thus, the display potentials of the pixels are substantially the same, so as to improve the problem of the non-uniform luminance of the pixels caused by the IR-drop.

It should be noted that the three conducting wires may be disposed on a substrate (not shown) of the OLED panel 302 and the substrate may be a glass substrate. Furthermore, from FIG. 3, it can be seen that the shape of the substrate may be a parallelogram, and the second terminals of the three conducting wires may be disposed on a side of the substrate.

Third Exemplary Embodiment

Figure 4:
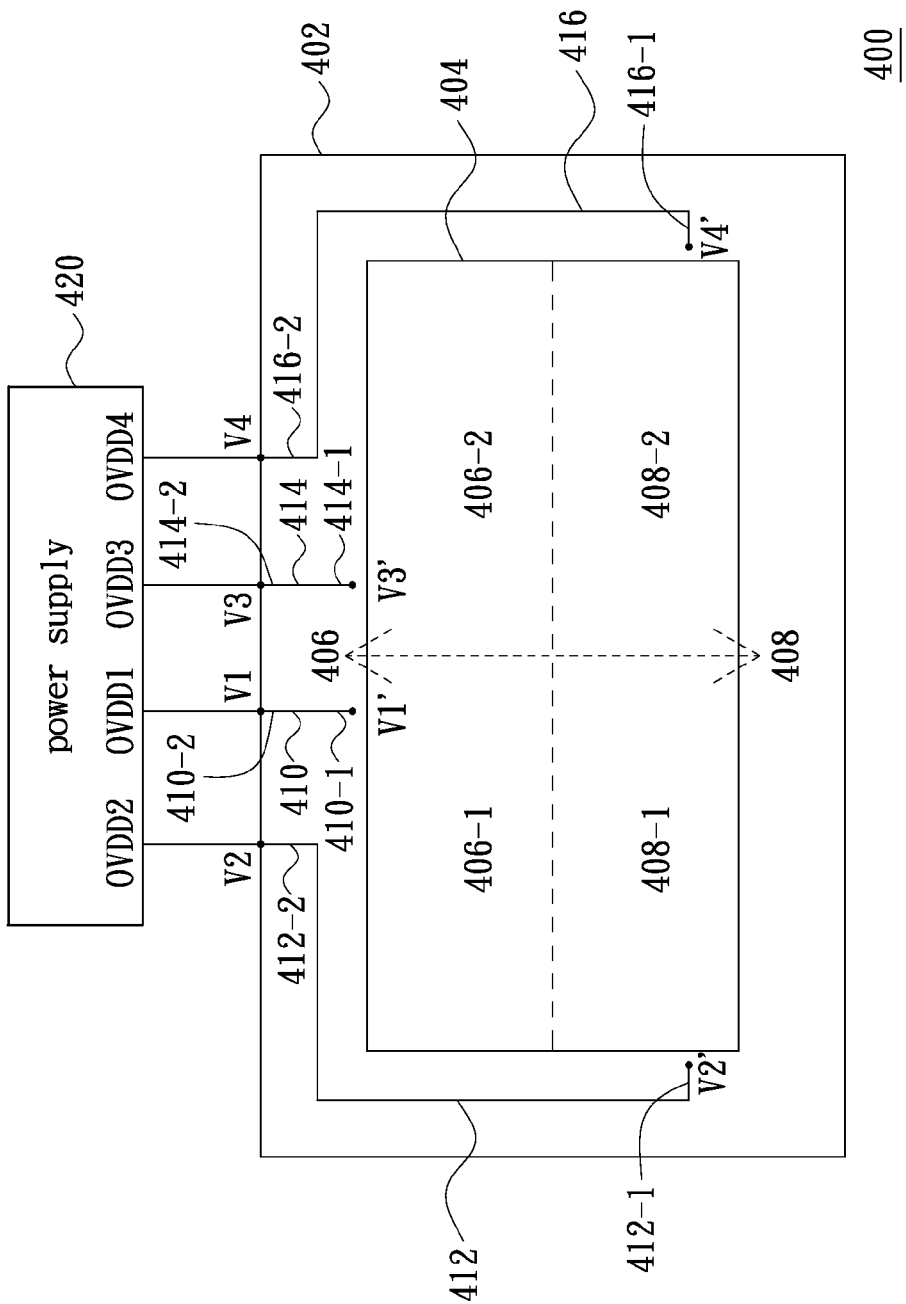
FIG. 4 is a schematic view of an OLED display in accordance with other exemplary embodiment of the present invention.

FIG. 4 is a schematic view of an OLED display in accordance with other exemplary embodiment of the present invention. Referring to FIG. 4, the OLED display 400 basically comprises an OLED panel 402, a conducting wire 410, a conducting wire 412, a conducting wire 414, a conducting wire 416 and a power supply 420. A display region 404 of the OLED panel 402 is divided into two sub-display regions indicated by marks 406 and 408. Furthermore, the sub-display region 406 is divided into two sub-sub-display regions indicated by marks 406-1 and 406-2, and the sub-display region 408 is divided into two sub-sub-display regions indicated by marks 408-1 and 408-2. In this exemplary embodiment, the areas of the four sub-sub-display regions are the same. However, in the actual application, the above areas of the four sub-sub-display regions may also be different from each other.

The above four conducting wires are all disposed on the OLED panel 402 and out of the display region 404. Furthermore, the first terminal 410-1 of the conducting wire 410 is electrically coupled to each of the pixels in the sub-sub-display region 406-1, the first terminal 412-1 of the conducting wire 412 is electrically coupled to each of the pixels in the sub-sub-display region 408-1, the first terminal 414-1 of the conducting wire 414 is electrically coupled to each of the pixels in the sub-sub-display region 406-2 and the first terminal 416-1 of the conducting wire 416 is electrically coupled to each of the pixels in the sub-sub-display region 408-2. The power supply 420 is electrically coupled to the second terminal 410-2 of the conducting wire 410, the second terminal 412-2 of the conducting wire 412, the second terminal 414-2 of the conducting wire 414 and the second terminal 416-2 of the conducting wire 416, so as to provide voltages OVDD1, OVDD2, OVDD3 and OVDD4 to the second terminal 410-2 of the conducting wire 410, the second terminal 412-2 of the conducting wire 412, the second terminal 414-2 of the conducting wire 414 and the second terminal 416-2 of the conducting wire 416 respectively.

From FIG. 4, it can be seen that the length of the conducting wire 412 is longer than that of the conducting wire 410, thus the resistance of the conducting wire 412 is larger than that of the conducting wire 410. In addition, the length of the conducting wire 416 is longer than that of the conducting wire 414, thus the resistance of the conducting wire 416 is larger than that of the conducting wire 414. Therefore, the circuit designer is able to adjust the value of the voltage OVDD2, so as to adjust the voltage (that is V2) of the second terminal 412-2 of the conducting wire 412 until the voltage (that is V2') of the first terminal 412-1 of the conducting wire 412 is substantially the same with the voltage (that is V1') of the first terminal 410-1 of the conducting wire 410. Furthermore, the circuit designer is able to adjust the value of the voltage OVDD4, so as to adjust the voltage (that is V4) of the second terminal 416-2 of the conducting wire 416 until the voltage (that is V4') of the first terminal 416-1 of the conducting wire 416 is substantially the same with the voltage (that is V3') of the first terminal 414-1 of the conducting wire 414.

Assuming that the length of the conducting wire 410 is the same with that of the conducting wire 414 and the length of the conducting wire 412 is the same with that of the conducting wire 416, the voltage OVDD3 can be the same with the voltage OVDD1 and the voltage OVDD4 can be the same with the voltage OVDD2.

From the above description, it can be seen that the display potential of each of the pixels in the sub-sub-display region 406-1 is provided by the voltage (that is V1') of the first terminal 410-1 of the conducting wire 410. The display potential of each of the pixels in the sub-sub-display region 408-1 is provided by the voltage (that is V2') of the first terminal 412-1 of the conducting wire 412. The display potential of each of the pixels in the sub-sub-display region 406-2 is provided by the voltage (that is V3') of the first terminal 414-1 of the conducting wire 414. The display potential of each of the pixels in the sub-sub-display region 408-2 is provided by the voltage (that is V4') of the first terminal 416-1 of the conducting wire 416. The power supply 420 provides four (or two) different voltages to the second terminals of the four conducting wires, so that the voltages of the first terminals of the four conducting wires are substantially the same. Therefore, the display potentials of the pixels are substantially the same, so as to improve the problem of the non-uniform luminance of the pixels caused by the IR-drop.

It should be noted that the four conducting wires may be disposed on a substrate (not shown) of the OLED panel 402 and the substrate may be a glass substrate. Furthermore, from FIG. 4 it can be seen that the shape of the substrate may be a parallelogram, and the second terminals of the four conducting wires may be disposed on a side of the substrate.

In summary, in the present invention, the display region of the panel is divided into two sub-display regions, and the two conducting wires of the present invention are both disposed on the panel and out of the display region. Furthermore, first terminals of the two conducting wires are electrically coupled to each of the pixels in the first sub-display region and the second sub-display region respectively. The length of one conducting wire is longer than that of another conducting wire, so that the resistance of the conducting wire is larger than that of the said another conducting wire. Therefore, the power supply of the present invention provides a relatively high voltage and a relatively low voltage to the second terminals of the relatively long conducting wire and the relatively short conducting wire respectively. Thus, the voltages of the first terminals of the two conducting wires are substantially the same. Therefore, the display potentials of the pixels are substantially the same, so as to improve the problem of the non-uniform luminance of the pixels caused by the IR-drop.

The above description is given by way of example, and not limitation. Given the above disclosure, one skilled in the art could devise variations that are within the scope and spirit of the invention disclosed herein, including configurations ways of the recessed portions and materials and/or designs of the attaching structures. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. An organic light-emitting diode (OLED) display, comprising:
   an OLED panel having a display region formed by a plurality of pixels, the display region being divided into a first sub-display region and a second sub-display region;
   a first conducting wire disposed on the OLED panel and out of the display region, and a first terminal of the first conducting wire being electrically coupled to each of the pixels in the first sub-display region;
   a second conducting wire disposed on the OLED panel and out of the display region, and a first terminal of the second conducting wire being electrically coupled to each of the pixels in the second sub-display region, wherein the length of the second conducting wire is longer than that of the first conducting wire so that the resistance of the second conducting wire is larger than that of the first conducting wire; and
   a power supply electrically coupled to a second terminal of the first conducting wire and a second terminal of the second conducting wire for providing a first voltage and a second voltage to the second terminal of the first conducting wire and the second terminal of the second conducting wire respectively, wherein the second voltage is larger than the first voltage so that the voltage of the first terminal of the second conducting wire is substantially the same with the voltage of the first terminal of the first conducting wire,
   wherein the second sub-display region is divided into a first sub-sub-display region and a second sub-sub-display region, the OLED display further comprises a third conducting wire disposed on the OLED panel and out of the display region, a first terminal of the third conducting wire is electrically coupled to each of the pixels in the second sub-sub-display region, and the first terminal of the second conducting wire is changed to be electrically coupled to each of the pixels in the first sub-sub-display region, the length of the third conducting wire is longer than that of the second conducting wire so that the resistance of the third conducting wire is larger than that of the second conducting wire, the power supply is further electrically coupled to the second terminal of the third conducting wire to provide a third voltage to the second terminal of the third conducting wire, the third voltage is larger than the second voltage so that the voltage of the first terminal of the third conducting wire is substantially the same with the voltage of the first terminal of the second conducting wire.

2. The OLED display as claimed in claim 1, wherein the area of the first sub-display region is the same with that of the second sub-display region.

3. The OLED display as claimed in claim 1, wherein the first conducing wire and the second conducting wire are both disposed on a substrate of the OLED panel.

4. The OLED display as claimed in claim 3, wherein the substrate is a glass substrate.

5. The OLED display as claimed in claim 3, wherein the shape of the substrate is a parallelogram, and the second terminal of the first conducting wire and the second terminal of the second conducting wire are both disposed on a side of the substrate.

6. The OLED display as claimed in claim 1, wherein the area of the first sub-display region, the area of the first sub-sub-display region and the area of the second sub-sub-display region are the same.

7. The OLED display as claimed in claim 1, wherein the first conducting wire, the second conducting wire and the third conducting wire are all disposed on a substrate of the OLED panel.

8. The OLED display as claimed in claim 7, wherein the substrate is a glass substrate.

9. The OLED display as claimed in claim 7, wherein the shape of the substrate is a parallelogram, and the second terminal of the first conducting wire, the second terminal of the second conducting wire and the second terminal of the third conducting wire are disposed on a side of the substrate.

10. An organic light-emitting diode (OLED) display, comprising:
   an OLED panel having a display region formed by a plurality of pixels, the display region being divided into a first sub-display region and a second sub-display region;
   a first conducting wire disposed on the OLED panel and out of the display region, and a first terminal of the first conducting wire being electrically coupled to each of the pixels in the first sub-display region;
   a second conducting wire disposed on the OLED panel and out of the display region, and a first terminal of the second conducting wire being electrically coupled to each of the pixels in the second sub-display region, wherein the length of the second conducting wire is longer than that of the first conducting wire so that the resistance of the second conducting wire is larger than that of the first conducting wire; and
   a power supply electrically coupled to a second terminal of the first conducting wire and a second terminal of the second conducting wire for providing a first voltage and a second voltage to the second terminal of the first conducting wire and the second terminal of the second conducting wire respectively, wherein the second voltage is larger than the first voltage so that the voltage of the first terminal of the second conducting wire is substantially the same with the voltage of the first terminal of the first conducting wire,
   wherein the first sub-display region is divided into a first sub-sub-display region and a second sub-sub-display region, the second sub-display region is divided into a third sub-sub-display region and a fourth sub-sub-display region, the OLED display further comprises a third conducting wire and a fourth conducting wire, the third conducting wire and the fourth conducting wire are both disposed on the OLED panel and out of the display region, a first terminal of the third conducting wire is electrically coupled to each of the pixels in the second sub-sub-display region, the first terminal of the first conducting wire is changed to be electrically coupled to each of the pixels in the first sub-sub-display region, a first terminal of the fourth conducting wire is electrically coupled to each of the pixels in the fourth sub-sub-display region, and the first terminal of the second conducting wire is changed to be electrically coupled to each of the pixels in the third sub-sub-display region, the length of the fourth conducting wire is longer than that of the third conducting wire so that the resistance of the fourth conducting wire is larger than that of the third conducting wire, the power supply is further electrically coupled to a second terminal of the third conducting wire and a second terminal of the fourth conducting wire to respectively provide a third voltage and a fourth voltage to the second terminal of the third conducting wire and the second terminal of the fourth conducting wire, the fourth voltage is larger than the third voltage so that the voltage of the first terminal of the fourth conducting wire is substantially the same with the voltage of the first terminal of the third conducting wire.

11. The OLED display as claimed in claim 10, wherein the area of the first sub-sub-display region, the area of the second sub-sub-display region, the area of the third sub-sub-display region and the area of the fourth sub-sub-display region are the same.

12. The OLED display as claimed in claim 10, wherein the first conducting wire, the second conducting wire, the third conducting wire and the fourth conducting wire are all disposed on a substrate of the OLED panel.

13. The OLED display as claimed in claim 12, wherein the substrate is a glass substrate.

14. The OLED display as claimed in claim 12, wherein the shape of the substrate is a parallelogram, and the second terminal of the first conducting wire, the second terminal of the second conducting wire, the second terminal of the third conducting wire and the second terminal of the fourth conducting wire are all disposed on a side of the substrate.

15. The OLED display as claimed in claim 12, wherein the third voltage is the same with the first voltage, and the fourth voltage is the same with the second voltage.

* * * * *